United States Patent [19]

Frazier

[11] Patent Number: 5,040,987

[45] Date of Patent: Aug. 20, 1991

[54] EDUCATIONAL AID FOR WORD AND NUMERAL RECOGNITION

[76] Inventor: Richard B. Frazier, P.O. Box 956, Cody, Wyo. 82414

[21] Appl. No.: 495,136

[22] Filed: Mar. 19, 1990

[51] Int. Cl.⁵ .............................................. G09B 1/00
[52] U.S. Cl. .................................. 434/188; 434/191; 434/205
[58] Field of Search ............... 434/205, 191, 188, 167, 434/171, 172, 176; 40/663

[56] References Cited

U.S. PATENT DOCUMENTS

| | | | |
|---|---|---|---|
| D. 163,085 | 5/1951 | Bishop | 434/205 X |
| 367,223 | 7/1887 | Moody . | |
| 723,425 | 3/1903 | Thompson | 434/191 X |
| 1,183,570 | 5/1916 | Kneeshaw . | |
| 1,396,379 | 11/1921 | Moore . | |
| 2,014,675 | 9/1935 | Webster | 434/205 X |
| 3,469,325 | 9/1969 | Greenberg | 434/191 X |
| 3,758,962 | 9/1973 | Bagdasar . | |
| 3,924,859 | 12/1975 | Kramer | 434/191 X |
| 4,808,111 | 2/1989 | Pratt | 434/205 X |
| 4,884,973 | 12/1989 | Pak | 434/191 |

*Primary Examiner*—Richard J. Apley
*Assistant Examiner*—Rachel M. Healey
*Attorney, Agent, or Firm*—Fleit, Jacobson, Cohn, Price, Holman & Stern

[57] ABSTRACT

An educational aid for word and numeral recognition including a baseboard and sets of cards positionable on the baseboard in aligned relation to enable a student to recognize numerals, the value of such numerals and the definitive word for such numerals. Each card is a relatively large, rigid panel having a numeral, the definitive word for the numeral and distinguishable colored dots indicating the value of the numeral on one side with the obverse side of each card eliminating the colored dots to provide a more advanced educational aid. The baseboard includes a pair of stationary symbols indicating the action or manipulation for the numerals indicated onto adjacent cards and the result of such manipulation or action between a second and third card with the first two cards indicating the problem and the third card indicating the solution to the problem. The symbol between the cards indicating the problem is reversible and interchangeable to indicate various mathematical actions or manipulations with respect to the numerals on the two adjacent cards indicating the problem. The cards include notches receiving the upwardly projecting symbols on the baseboard to retain the cards in alignment with each and the baseboard is provided with an edge flange and a recess in an opposite edge to facilitate positioning of the cards and enabling the cards to be more easily picked up and placed in position on the baseboard.

4 Claims, 1 Drawing Sheet

U.S. Patent     Aug. 20, 1991     5,040,987
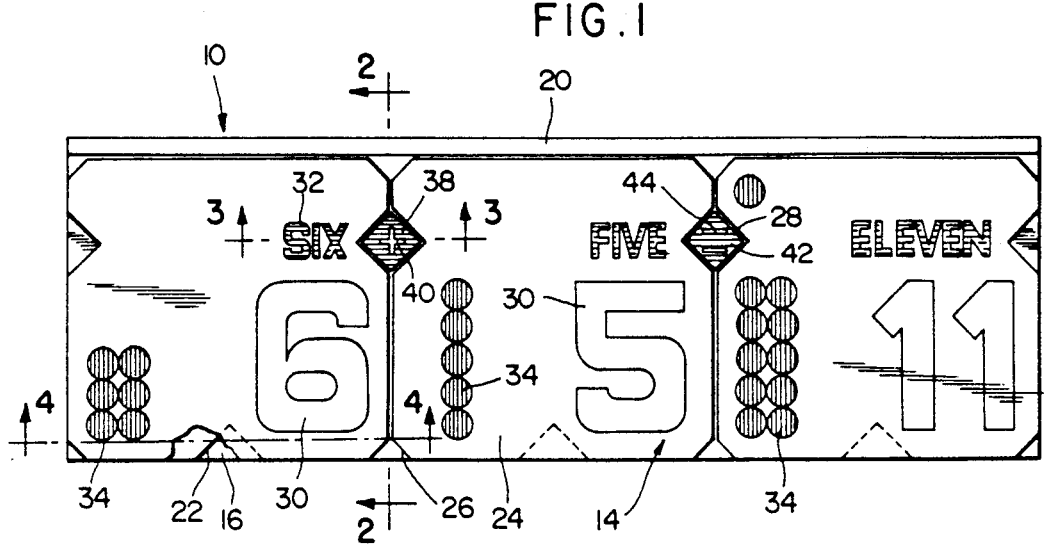
FIG. 1
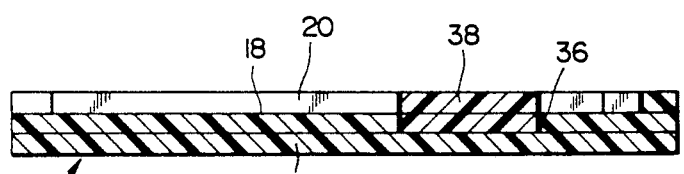
FIG. 2
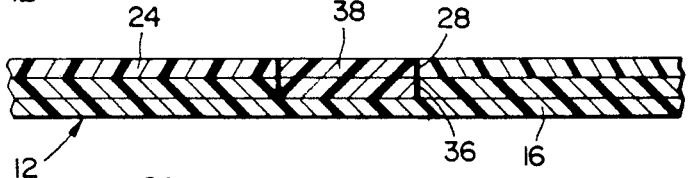
FIG. 3
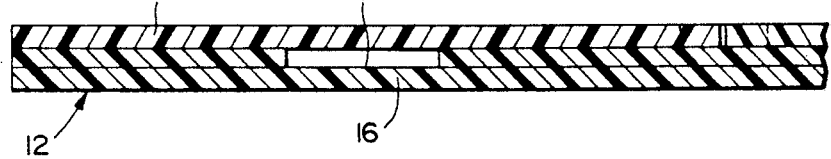
FIG. 4
FIG. 5
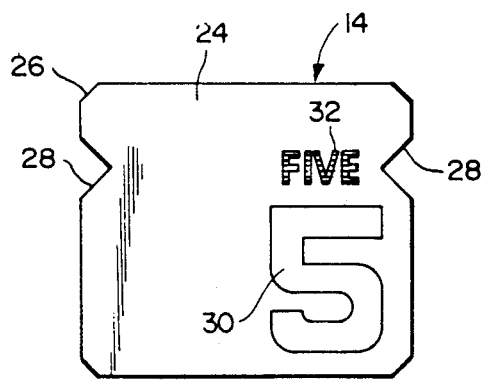
FIG. 6
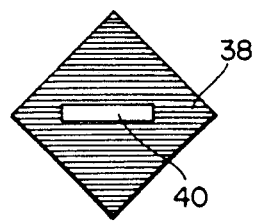

EDUCATIONAL AID FOR WORD AND NUMERAL RECOGNITION

BACKGROUND OF THE INVENTION

1. Field of the Invention

The present invention generally relates to an educational aid for word and numeral recognition including a baseboard and sets of cards positionable on the baseboard in aligned relation to enable a student to recognize numerals, the value of such numerals and the definitive word for such numerals. Each card is a relatively large, rigid panel having a numeral, the definitive word for the numeral and distinguishable colored dots indicating the value of the numeral on one side with the obverse side of each card having the same indicia except for the colored dots to provide a more advanced educational aid. The baseboard includes a pair of stationary symbols indicating the action or manipulation for the numerals on two adjacent cards and the result of such manipulation or action between a second and third card with the first two cards indicating the problem and the third card indicating the solution to the problem. The symbol between the cards indicating the problem is reversible and interchangeable to indicate various mathematical actions or manipulations with respect to the numerals on the two adjacent cards indicating the problem. The cards include notches receiving the upwardly projecting symbols on the baseboard to retain the cards in alignment with each and the baseboard is provided with an edge flange and a recess in an opposite edge to facilitate positioning of the cards and enabling the cards to be more easily picked up and placed in position on the baseboard.

2. Information Disclosure Statement

Many prior patents exist which may be considered educational aids, teaching aids and the like. The following U.S. patents relate generally to this type of device:

367,223
1,183,570
1,396,379
3,758,962
4,808,111

U.S. Pat. No. 367,223 includes cards with various indicia printed thereon including numerals and problems on one side and colored dots on the obverse side with the number of dots corresponding to the numeral printed on the cards with the dots being arranged by color to illustrate various combinations possible to total the sum of the dots. U.S. Pat. No. 1,183,570 uses slide panels with varied numbers of spots representing numbers so the panels can be slid into adjacent relation to provide a problem and solution. U.S. Pat. No. 1,396,379 discloses a framework supporting slides which can be moved laterally into various positions with pins being provided over which blocks can be positioned if a correct solution has been provided to a problem. U.S. Pat. No. 3,758,962 discloses a a container with symbols and colored dots providing a large variety of mathematical manipulations. U.S. Pat. No. 4,808,111 discloses a baseplate or board with inserts with the inserts and recesses including corresponding notches so the inserts can fit into the recesses. None of the prior patents discussed above discloses a structure equivalent to this invention.

SUMMARY OF THE INVENTION

An object of the present invention is to provide an educational aid for word and numeral recognition including sets of cards with each card being in the form of a relatively large, rigid panel having a single or multiple digit inscribed on both surfaces thereof, a definitive word or words for the numeral on both sides thereof located immediately above the numeral and a corresponding number of colored dots on only one surface of the card with the card being symmetrical and used with either face positioned upwardly.

Another object of the invention is to provide an educational aid in accordance with the preceding object in which the cards are oriented on a baseboard including a structure on the upper surface thereof to cooperate with the cards to position the cards in alignment with two cards being in alignment to provide a problem and a third card being in alignment with the other cards to indicate a solution to the problem with the upper surface of the baseboard including symbols indicating the mathematical manipulation or action to be taken by the first two cards and a symbol indicating the result or solution to the problem.

A further object of the invention is to provide an educational aid in accordance with the preceding objects in which the symbol indicating the action or manipulation is removable, reversible and interchangeable to enable various manipulations or actions to be indicated by the symbol.

Still another object of the invention is to provide an educational aid in which the symbols on the baseboard project upwardly therefrom and are generally diamond shaped in configuration with the side edges of all the cards including V-shaped notches to register with and engage the projections for retaining the cards in alignment on the upper surface of the baseboard.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of the educational aid of the present invention illustrating three cards oriented on a baseboard with a typical problem being illustrated along with its solution.

FIG. 2 is a transverse, sectional view, on an enlarged scale, taken substantially upon a plane passing along section line 2—2 on FIG. 1 illustrating further structural details of the baseboard and the reversible and interchangeable symbol.

FIG. 3 is a fragmental, longitudinal, sectional view taken substantially upon a plane passing along section line 3—3 on FIG. 2 illustrating further structural details of the reversible symbol and the association of the cards therewith.

FIG. 4 is a longitudinal, sectional view, on an enlarged scale, taken substantially upon a plane passing along section line 4—4 on FIG. 1 illustrating the association of the cards with the free edge of the baseboard.

FIG. 5 is a plan view of one of the cards illustrating the obverse side thereof.

FIG. 6 is a plan view of the reversible symbol illustrating the obverse side thereof as compared to FIG. 1.

DESCRIPTION OF THE PREFERRED EMBODIMENT

The educational aid of the present invention is generally designated by reference numeral 10 and includes a baseboard generally designated by the reference numeral 12 and a plurality of cards, each of which is generally designated by reference numeral 14.

The baseboard 12 is in the form of an elongated, rectangular baseboard 16 having a substantially planar upper surface 18 with an upstanding edge flange 20 along the upper edge thereof and a plurality of notches 22 along the lower edge thereof as illustrated in FIG. 1. The baseboard and flange may be of one-piece construction and may be constructed of lightweight, foam plastic material or the like or of any other rigid material including wood, metal or any combination thereof. The overall length and width of the upper surface 18 of the baseboard 16 is sufficient to receive three cards 14 as illustrated in FIG. 1 in which a typical problem has been included for purposes of describing the structure and function of the educational aid.

Each of the cards 14 is of identical construction insofar as the shape is concerned and is in the form of a generally square or rectangular, rigid panel 24 which may also be constructed of lightweight plastic material, cardboard, wood, metal or the like. Each card 24 includes inclined corners 26 and an inwardly extending V-shaped notch 28 in each side edge thereof which is closer to the upper edge than the lower edge of the panel 24. One surface of the card 24 is provided with a numeral 30 inscribed thereon such as by printing or the like with the numeral being disposed adjacent the lower right-hand corner thereof and being relatively large for easy observation and sufficiently large to enable a person using the card to trace the numeral by placing the tip of the finger thereon and moving around the interior of the numeral. Immediately above the numeral 30, a word 32 which defines or names the numeral is provided which may be of a distinguishable color or may be black while the numeral may be a distinguishable color or white. On that surface of the card, adjacent the left-hand corner thereof, a plurality of colored dots 34 are inscribed which indicate the value of the numeral and the word definition thereof by including the same number of colored dots as indicated by the numeral and word thereby enabling an observer to realize the value of the numeral and the word. The obverse side of each card as illustrated in FIG. 5 includes the same numeral 30 and the same descriptive word or word definition 32 naming the numeral but the obverse surface does not have any colored dots thereon so the educational aid may be used with either face of the card facing upwardly depending upon the requirements of the individual users.

The baseboard 16 is provided with a recess 36 in the upper surface thereof which is of diamond shaped configuration and is positioned for alignment with a pair of opposed notches 28 when adjacent cards are positioned on the baseboard. A diamond shaped insert 38 is positioned in the recess 36 and extends above the surface 18 of the baseboard 16 to a point generally flush with the upper surfaces of the cards 14 positioned on the baseboard with the shape and configuration of the insert 38 corresponding to the pair of opposed V-shaped notches 28 as illustrated in FIG. 1. Each surface of the insert 38 is provided with a mathematical symbol 40 thereon which is readily distinguishable with the obverse of the insert including a different mathematical symbol 40 thus indicating the mathematical action or manipulation to be performed with respect to the numerals indicated on the adjacent cards. As illustrated in FIG. 1, the symbol 40 is a plus or addition symbol whereas the symbol 40 illustrated in FIG. 6 on the obverse side is the minus or subtraction symbol. The symbols may well be a multiplication symbol or a division symbol thus enabling various mathematical actions or manipulations to be taken with respect to the numerals indicated by the cards.

The baseboard includes a stationary projection 42 which is the same shape as the insert 38 and also engages the notches 28 with the projection 42 including a symbol 44 which indicates the results of the mathematical action or manipulation between the two cards thus indicating the solution to the problem by the use of an equal symbol. Thus, in the problem as set up, the numeral 6 plus the numeral 5 equals the numeral 11 and the colored dots on the card having the numeral 11 thereon represents the sum of or addition of the 6 and 5 dots on the problem cards as illustrated in FIG. 1.

The flange or ledge 20 provides a guide for positioning the cards in place on the baseboard and the insert 38 and projection 42 locate and align the cards in relation to each other with the side edges thereof in adjacent, abutting relation. By providing each card with identical notches on each side, the cards then can be oriented in various relationships in order for various mathematical manipulations and actions to be illustrated for educating an observer. The notches 22 in the lower edge of the baseboard 12 provide a finger receiving recess to facilitate the insertion of the finger under the lower edge of the card and lifting it up when desired and also facilitate placement of the card on the baseboard. The cards may be provided in sets of ten cards, each such as the 1-10 cards and one set of 11-20 cards. An additional three card set of zero (0) cards would also be included. By counting the number of colored dots on the faces of the cards and relating the quantity to the word and numeral on that card face, the numbers 1-20 can be learned although this number of cards and the number of numerals and words that can be learned can be varied. Likewise, the concept of zero as a quantity and the manipulations of arithmetical activities involving zero can be learned in this manner. After the relationship between the colored dots and the word symbols have been learned, the cards can be reversed and the teaching drill continued without reference to the colored dots. By manipulating the cards in a particular manner on the baseboard and by varying the symbol on the insert 38, various mathematical computations can be performed in an accurate and interesting manner with the device being especially adapted for use by young students in order to familiarize themselves with various numerals, word definitions of the numerals and the value of the numerals as well as what happens when numerals are added, subtracted, multiplied and divided.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An educational aid for work and numeral recognition comprising a plurality of identical cards for positioning in alignment with each other, each of said cards including a numeral inscribed on at least one surface thereof and a word definition of that numeral inscribed thereon adjacent the numeral, and means engaged with the cards to retain at least three cards in alignment with such means including symbols indicating a mathematical manipulation of the numerals on two adjacent cards and the result of the mathematical manipulation on the third card, each side edge of each card including a notch, said means retaining the cards in alignment includes a projection received partially in the notches in adjacent opposed edges of adjacent cards to retain the cards in alignment, a baseboard underlying the cards and provided with a substantially planar upper surface with the projections being mounted on the baseboard to retain the cards in alignment on the baseboard, each of the notches in the side edges of the cards being of V-shaped configuration and each of said projections being of diamond shaped configuration for reception in the notches in adjacent edges of adjacent cards, the projection having the mathematical manipulation symbol thereon being removably mounted on the baseboard and including a different symbol on the obverse side thereof to enable different mathematical manipulations to be performed.

2. The structure as defined in claim 1 wherein the upper surface of the baseboard includes a recess shaped to telescopically receive the projection to enable inversion of the projection and interchangeability of the projection with projections having other mathematical manipulation symbols.

3. The structure as defined in claim 2 wherein each of said cards includes a plurality of distinguishably colored dots on the surface thereof with the number of dots corresponding with the value of the numeral and the word definition of the numeral.

4. The structure as defined in claim 3 wherein each of said cards includes the numeral and word definition of the numeral only on the obverse side thereof.

* * * * *